United States Patent [19]

Sumimura et al.

[11] 4,273,697

[45] Jun. 16, 1981

[54] ELECTRICALLY CONDUCTIVE CURABLE LIQUID ORGANOPOLYSILOXANE COMPOSITIONS

[75] Inventors: Shinichi Sumimura; Koji Shimuzu, both of Ichihara, Japan

[73] Assignee: Toray Silicone Company, Ltd., Tokyo, Japan

[21] Appl. No.: 122,782

[22] Filed: Feb. 19, 1980

[30]     Foreign Application Priority Data

Mar. 9, 1979 [JP]   Japan ................................. 54-26760

[51] Int. Cl.³ ............................................. C08L 83/04
[52] U.S. Cl. ................................ 260/37 SB; 252/511
[58] Field of Search ................... 260/37 SB; 252/511; 106/307

[56]     References Cited

U.S. PATENT DOCUMENTS

| | | | |
|---|---|---|---|
| 3,398,112 | 8/1968 | Johnson et al. | 260/37 SB |
| 3,959,008 | 5/1976 | Warner et al. | 106/307 |
| 4,051,454 | 9/1977 | Leiser et al. | 260/37 SB |
| 4,130,707 | 12/1978 | Leiser et al. | 252/511 |
| 4,145,317 | 3/1979 | Sado et al. | 252/512 |

FOREIGN PATENT DOCUMENTS 653350 12/1962 Canada .
2527850 1/1977 Fed. Rep. of Germany .
89464 7/1975 Japan .

*Primary Examiner*—Lewis T. Jacobs
*Attorney, Agent, or Firm*—Roger H. Borrousch

[57]     ABSTRACT

A curable liquid composition containing a liquid polyorganosiloxane and carbon black whose specific surface area is at least 900 m²/g and which are hollow-shell-shaped particles cures to a product having excellent electrical conductivity.

10 Claims, No Drawings

ELECTRICALLY CONDUCTIVE CURABLE LIQUID ORGANOPOLYSILOXANE COMPOSITIONS

BACKGROUND OF THE INVENTION

1. Field of the Invention

The present invention relates to a curable liquid organopolysiloxane composition which produces a cured product having excellent electrical conductivity.

2. Description of the Prior Art

Compositions are known in which an organopolysiloxane is compounded with a conductive material such as carbon black, graphite and carbon fiber in order to impart electrical conductivity to silicone rubber. However, the desired electrical conductivity cannot be obtained unless a large quantity of conductive material, such as carbon black or graphite, is present in the composition. On the other hand, the flowability significantly decreases when a large quantity of conductive material is present causing difficulty in mixing and molding. In order to overcome these drawbacks, it was proposed in Kokai Japanese Patent Sho 50(1975)-89464 that carbon fiber as a conductive material be compounded into the composition. However, since carbon fiber is very expensive, the cost of production is increased. There is another drawback that the surface smoothness of silicone rubber is affected when carbon fiber with a certain length is used.

SUMMARY OF THE INVENTION

To overcome these above-mentioned drawbacks of the conventional compositions, this invention proposes a curable liquid organopolysiloxane composition which can form a cured product having good electrical conductivity using an extremely small amount of certain carbon black compared to the amount of carbon black used in the conventional compositions and also having excellent physical properties such as tensile strength and elongation. The carbon black used in the present invention has a specific surface area of at least 900 m²/g and has hollow-shell-shaped particles.

Description of the Invention

This invention relates to a curable a liquid composition comprising (A) 100 parts by weight of a curable liquid organopolysiloxane comprising a liquid polyorganosiloxane and a cross-linking agent, (B) 0.1–70 parts by weight of carbon black whose specific surface is at least 900 m²/g and which are hollow-shell-shaped particles, and (C) 0–50 parts by weight of a hydroxyl endblocked polydiorganosiloxane whose degree of polymerization is 50 or less.

The curable liquid organopolysiloxane, component (A) used in this invention, is a mixture of a liquid polyorganosiloxane and a cross-linking agent. With respect to a curing mechanism, those of a radical reaction type using the conventional known organic peroxides, those of a condensation reaction type and those of an addition reaction type are all included. The liquid polyorganosiloxane can be expressed by siloxane units which are bonded together by Si-O-Si bonds and which can be expressed by a general unit formula $$R_a SiO_{\frac{4-a}{2}}$$

in which each R represents a substituted or unsubstituted monovalent hydrocarbon radical such as methyl, ethyl, propyl, octyl, phenyl, vinyl or trifluoropropyl and in each siloxane unit a is an integer from 1 to 3 inclusive. As long as the polyorganosiloxane is in a liquid form at room temperature, its molecular structure can be a straight chain, a branched chain, a network structure or a slightly three-dimensional structure. This polyorganosiloxane can be a homopolymer or copolymer or mixture of two or more types of polymers. The viscosity is not particularly critical as long as the polyorganosiloxane is in a liquid state at room temperature. However, the viscosity at 25° C. preferably ranges from 0.0001 to 0.1 m²/s for best workability.

The liquid polyorganosiloxane used in the radical reaction using an organic peroxide preferably contains vinyl radicals bonded to silicon atoms either at the polymer ends or along the polymer chain. The organic peroxides which are used as cross-linking agents are those commonly known as cross-linking agents for silicone rubber. Examples of these organic peroxides are as follows: benzoyl peroxide, dicumyl peroxide, di-tert-butyl peroxide, tert-butyl perbenzoate, 2,5-dimethyl-2,5-di(tert-butylperoxy)hexane.

The liquid polyorganosiloxane used in the condensation reaction is polyorganosiloxane containing silicon-bonded hydroxyl groups at the ends of the polymer molecules. The cross-linking agent for the condensation reaction can be a functional compound selected from silanes, their partial hydrolysis—condensation products, cyclic polyorganosiloxanes, straight chain polyorganosiloxanes and mixtures thereof wherein each silane or siloxane has at least two functional groups per molecule which are bonded to silicon atoms and which are hydrolyzable with moisture. The functional groups are selected from among alkoxy groups, carboxyl groups, amino groups, aminoxy groups, oxime groups, amido groups, imido groups, vinyloxy groups and lactam groups. Except in the case of quadri-functional silanes, the substituted or unsubstituted monovalent hydrocarbon radicals can be bonded to a silicon atom in addition to the functional groups. For the condensation reaction, the cross-linking agent can also include catalysts which accelerate the condensation reaction between hydroxyl-group-containing polyorganosiloxane and silane or siloxane containing the abovementioned functional groups. The catalyst can be metal salts of organic carboxylic acids, in which examples of carboxylic acids include acetic acid, octanoic acid, lauric acid, stearic acid, oleic acid, linolic acid, benzoic acid and naphthoic acid, and examples of metals include tin, lead, iron, antimony, zirconium, cadmium, barium, calcium, titanium, bismuth and manganese. Other catalyst can be titanium compounds such as:

$$Ti(OR^1)_4, (OR^1)_n TiO_{\frac{4-n}{2}},$$

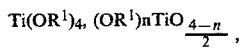, and 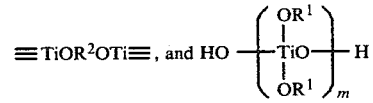

where each $R^1$ represents a substituted or unsubstituted monovalent hydrocarbon radical, $R^2$ represents a divalent organic group, n is an integer from 1 to 3, and m is an integer greater than or equal to 1. These titanium compounds include chelates of titanium.

The liquid polyorganosiloxane used in the addition reaction is a polyorganosiloxane having vinyl radicals bonded to silicon atoms either at the polymer ends or along the polymer chain. The cross-linking agent for the addition reaction is an organohydrogensilane or a polyorganohydrogensiloxane and a catalyst for accelerating the addition reaction. The organohydrogensilane or polyorganohydrogensiloxane can be represented by the average unit formula $$R_b H_c SiO_{\frac{4-b-c}{2}}$$

where R is defined above, b is $0<b\leq3$, c is $0<c\leq2$, and the sum of b+c is $0<b+c\leq4$. A cyclic or linear polyorganohydrogensiloxane having at least two SiH groups per molecule is particularly preferred. For the addition reaction, the catalyst can be a metal or compound of platinum, rhodium or palladium. However, platinum or platinum compounds are preferred. Examples include platinum adhering to a support, chloroplatinic acid hexahydrate, alcohol-modified chloroplatinate, complexes of platinum and olefins, complexes of platinum and ketones and complexes of platinum and vinylsiloxanes.

It is known that vulcanization is interferred with when carbon black is compounded with a radical reaction type silicone rubber using an organic peroxide. As a result, the types of carbon black which can be compounded with silicone rubber are limited and curing may not occur using a certain type of organic peroxide using component (B) of this invention. Even if curing is possible the amount of organic peroxide used must be increased compared to the usual curing of silicone rubber. However, no such effect is present with the addition of component (B) in the case of addition reaction type silicone rubber. Thus, there is the advantage that the reaction can be handled in the same manner as the usual addition reaction. In addition, there is another advantage that the addition reaction type silicone rubber has superior heat resistance and flame retardancy compared to the condensation reaction and radical reaction types of silicone rubber.

Carbon black, component (B) used in this invention, is different in various ways from the conventional carbon blacks such as acetylene black, furnace black, thermal black and channel black. Its most remarkable characteristics are the fact that the specific surface area is at least 900 m²/g and that the particles are hollow-shell-shaped particles. The characteristics of the conventional carbon black are as follows: specific surface area, 50–500 m²/g; oil absorption, 80–130 ml/100 g; pH, 3–11; average particle size, 15–500 mμ; while the characteristics of the carbon black used in this invention are as follows: specific surface area, 900–1100 m²/g (average, 1000 m²/g); oil absorption, 300–400 ml/100 g (average, 340 ml/100 g); pH, 9.5; average particle size 30 mμ. Although the carbon black used in this invention is inferior in terms of dispersibility compared to the conventional carbon black, it has excellent electrical conductivity. With respect to the amount of carbon black used, the same degree of electrical conductivity can be obtained with only ⅛–¼ of the amount of carbon black of this invention compared to the amount of the conventional carbon black. Therefore, flowability is not significantly reduced. As a result, molding work such as that involved in pouring type molding and injection molding can be done very easily. A commercial product of this type of carbon black is Ketjenblack EC (Lion Akuzo K.K.). The commercial product can be used without any treatment, or a product which is partially graphitized by baking at 1500°–2000° C. or one which is totally graphitized can be also used. The amount to be used depends upon the desired degree of electrical conductivity. However, it generally ranges from 0.1 to 70 parts by weight to 100 parts by weight of organopolysiloxane as component (A) and preferably from 1 to 40 parts by weight.

Component (C) used in this invention is a polydiorganosiloxane having hydroxyl groups at both ends of the molecule. This component is not always an indispensable component in the composition of this invention. However, since dispersibility of component (B) is poor, it is an effective component which can improve dispersibility, flowability and electrical conductivity as well. Such an effect cannot be obtained in the case of polydiorganosiloxane in which both molecular chain terminals are blocked with triorganosilyl groups. This diorganopolysiloxane is expressed by the general formula

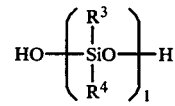

where each $R^3$ and $R^4$ is the same as R defined above and can be the same or different, and preferably are methyl groups, vinyl groups, phenyl groups and groups including alkylene units, and l is an integer less than or equal to 50. The amount of addition of component (C) ranges from 0 to 50 parts by weight to 100 parts by weight of organopolysiloxane as a component (A). If it exceeds 50 parts by weight, the physcial properties are affected.

The composition of this invention can be prepared simply by mixing component (A) and component (B), or by mixing component (A), component (B) and component (C). If component (C) is used, component (B) can be wetted or dispersed with component (C) in advance and subsequently the mixture can be added to component (A). In addition to the above-mentioned components, other additives can be used if desirable. Examples of these additives are electrically conductive materials such as other types of carbon black, graphite, carbon fiber, metal wire and metal particles; fillers such as fumed silica, precipitated silica, quartz powder, diaatomaceous earth, calcium carbonate and sintered clay, metal oxides such as titanium oxide, iron oxide and zinc oxide; curing retarders, plasticizers; heat resistance agents; flame retardants; organic solvents and other additives.

The compositions of this invention can be used for connectors of keyboards of electric calculators, cores of ignition cable and gaskets for microwave ovens.

The following examples are included for illustrative purposes only and should not be construed as limiting the invention which is properly delineated in the claims. "Parts" indicated in these examples implies "parts by weight". The viscosity was measured at 25° C.

EXAMPLE 1

Polydimethylsiloxane (100 parts) consisting of 97 mol% of dimethylsiloxane units blocked at both ends with trimethylsilyl groups and 3 mol% of methylvinylsiloxane units (viscosity: 0.0007 m²/s) was homogeneously blended with Ketjenblack EC (Lion Akuzo K.K.) (15 parts) and dicumyl peroxide (3 parts). This mixture was used in Experiment No. 1. Similarly, polydimethylsiloxane having hydroxyl groups on both ends of the molecule with an average degree of polymerization of 10 (5 parts) was added to the above mixture and the mixture was used in Experiment No. 2. As a comparative example, Denka Black (Denki Kagaku Kogyo K.K.) (20 parts) was used in the mixture instead of Keychain Black EC as in Experiment No. 1 and the mixture was used in Experiment No. 3. Denka Black is an acetylene black, has high structure, does not have hollow-shell-shaped particles, has a specific surface area of 61 m²/g, an oil absorption of 115 cubic centimeters per 100 grams, a pH of 6.5 and an average particle size of 42 millimicrons. The viscosity of each composition was measured. Thereafter, the composition was placed in a mold and cured under a pressure of 20 kg/cm² at a temperature of 160° C. for 10 minutes. The hardness, tensile strength, elongation, and volume resistivity of the cured product were measured. The results are presented in Table I. In Experiment No. 3, conductivity was poor in spite of the addition of a large quantity of Denka Black, and the viscosity increased. The viscosity was the volume resistivity was 0.30 Ω-m. Thus, the addition of this compound did not show the effect of component (C) used in this invention.

TABLE I

| | This invention | | Comparative Example |
|---|---|---|---|
| Experiment No. | 1 | 2 | 3 |
| Component (Parts) | | | |
| (A) Dimethylpolysiloxane containing vinyl groups | 100 | 100 | 100 |
| Dicumyl peroxide | 3 | 3 | 3 |
| (B) Ketjenblack EC | 15 | 15 | |
| Denka Black | | | 20 |
| (C) Dimethylpolysiloxane containing terminal hydroxyl groups on both ends | | 5 | |
| Physical Properties | | | |
| Viscosity before curing (Pa·s) | 320 | 20 | 500 |
| Hardness | 41 | 35 | 36 |
| Tensile breaking strength (MPa) | 3.14 | 2.84 | 1.77 |
| Tensile breaking elongation (%) | 422 | 508 | 305 |
| Volume resistivity (Ω-m) | 0.11 | 0.06 | 1.65 |

EXAMPLE 2

Polydimethylsiloxane (100 parts) having terminal hydroxyl groups with a viscosity of 0.0002 m²/s was mixed by stirring with an alkoxysilane (5 parts) as shown in Table II, Ketjenblack EC (Lion Akuzo K.K.) (10 parts) and dibutyltin dilaurate (0.5 parts). The composition was poured into a mold and cured by leaving the mold at room temperature overnight, as Experiment No. 4. Similarly, 0.5 part of dibutyltin dilaurate was used and an aminoxysilane was used as a cross-linking agent instead of alkoxysilane, as Experiment No. 5. The 0.5 part of dibutyltin dilaurate was used and an oximesilane was used as Experiment No. 6. Dimethylpolysiloxane with hydroxyl groups on both ends used in Example 1 (5 parts) was added to the mixture as in Experiment No. 6, for Experiment No. 7. As a comparative example, the same amount of Denka Black (Denki Kagaku Kogyo K.K.) was compounded instead of Ketjenblack EC as in Experiment No. 4, for Experiment No. 8. The physical properties of the cured products were measured. The results are presented in Table II.

TABLE II

| | This invention | | | | Comparative Example |
|---|---|---|---|---|---|
| Experiment No. | 4 | 5 | 6 | 7 | 8 |
| Component (Parts) | | | | | |
| (A) Dimethylpolysiloxane | 100 | 100 | 100 | 100 | 100 |
| $(CH_2=CH)Si(OCH_3)_3$ | 5 | | | | 5 |
| $CH_3Si[ON(C_2H_5)_2]_3$ | | 5 | | | |
| $CH_3Si[ON=C(C_2H_5)(CH_3)]_3$ | | | 5 | 5 | |
| (B) Ketjenblack EC | 10 | 10 | 10 | 10 | |
| Denka Black | | | | | 10 |
| (C) Dimethylpolysiloxane containing terminal hydroxyl groups on both ends | | | | 5 | |
| Physical Properties | | | | | |
| Viscosity before curing (Pa·s) | 160 | 170 | 170 | 100 | 380 |
| Hardness | 18 | 16 | 16 | 22 | 12 |
| Tensile breaking strength (MPa) | 2.06 | 1.77 | 1.57 | 1.86 | 0.98 |
| Tensile breaking elongation (%) | 220 | 270 | 280 | 260 | 180 |
| Volume resistivity (-m) | 0.55 | 0.26 | 0.31 | 0.22 | 3.00 | lowered significantly by adding a small amount of component (C) to both components (A) and (B), and the conductivity was also improved. If polydimethylsiloxane having trimethylsilyl groups on both ends of the molecule with an average degree of polymerization of 10 (5 parts) was compounded instead of component (C) as in Experiment No. 2, the viscosity was 180 Pa·s and

EXAMPLE III

Polydimethylsiloxane (100 parts) having dimethylvinylsilyl groups on both ends of the molecule with a viscosity of 0.002 m²/s was mixed with polymethylhydrogensiloxane (3 parts) having trimethylsilyl groups on both ends of the molecule with a viscosity of 0.00001 m$^2$/s and Ketjenblack EC (Lion Akuzo K.K.) in three different amounts as shown in Table III. In addition, a solution of chloroplatinic acid hexahydrate in ethanol was used as a catalyst in an amount of 15 ppm as platinum based on the total amount of the above-mentioned polysiloxane. The composition was poured into a mold and cured in an oven at 150° C. for 30 minutes as Experiments Nos. 9, 10 and 11. As a comparative example, the same amount of Vulcan XC-72 (Cabot Corp.) was added instead of the Ketjenblack EC in Experiment 10, and the mixture was cured for Experiment No. 12. Vulcan XC-72 has a specific area of 254 m$^2$/g, an oil absorption of 185 cubic centimeters per 100 grams, a pH of 7.2 and an average particle size of 30 millimicrons. When dimethylpolysiloxane having terminal hydroxyl groups at both ends as in Example 1 (5 parts) was added to the mixture as in Experiment No. 9, the volume resistivity was 0.24 Ω-m.

Tests for heat resistance and flame retardancy were conducted on the following four specimens: Experiment No. 1 in Example 1, Experiment No. 4 in Example 2, and Experiments Nos. 10 and 12 in Example 3. The most excellent results were obtained in the case of Experiment No. 10 using an addition reaction type liquid organopolysiloxane. The results are presented in Table IV. The flame retardancy was measured as follows. A test specimen with a length of 130 mm, a width of 13 mm and a thickness of 2 mm was prepared and fixed in still air. The flame of a Bunsen burner was applied for 15 seconds for ignition in such a position that the lower end of the experimental specimen was brought into contact with the upper section of the inner flame of the Bunsen burner. Subsequently, the Bunsen burner was taken away and the time required for the flame to extinguish (seconds) was measured. This test was repeated twice for five test specimens. The average value of each test series was expressed as flame retardancy.

TABLE III

| | This Invention | | | Comparative Example |
|---|---|---|---|---|
| Experiment No. | 9 | 10 | 11 | 12 |
| Component (Parts) | | | | |
| (A) Dimethylpolysiloxane containing vinyl groups | 100 | 100 | 100 | 100 |
| Methylhydrogenpolysiloxane | 3 | 3 | 3 | 3 |
| (B) Ketjenblack EC | 10 | 12 | 14 | |
| Vulcan XC-72 | | | | 12 |
| Hardness | 26 | 30 | 35 | 21 |
| Tensile breaking strength (MPa) | 1.77 | 2.65 | 3.14 | 1.27 |
| Tensile breaking elongation (%) | 284 | 406 | 480 | 125 |
| Volume resistivity (Ω-m) | 0.32 | 0.18 | 0.10 | 70.0 |

TABLE IV

| Experiment No. | No. 1 | No. 4 | No. 10 | No. 12 |
|---|---|---|---|---|
| [Heat resistance] | | | | |
| Before heating | | | | |
| Tensile breaking strength (MPa) | 1.34 | 2.06 | 2.65 | 1.27 |
| Tensile breaking elongation (%) | 422 | 220 | 406 | 125 |
| After heating at 220° C. for 96 hours | | | | |
| Tensile breaking strength (MPa) | 3.33 | 2.84 | 2.75 | 4.22 |
| Tensile breaking elongation (%) | 391 | 178 | 430 | 65 |
| [Flame retardancy] | | | | |
| First (second) | Total destruction | Total destruction | 5 | 30 |
| Second (second) | — | — | 12 | 52 |

EXAMPLE 4

Polydimethylsiloxane copolymer (70 parts) having terminal methylphenylvinylsilyl groups on both ends which consisted of 90 mol% of dimethylsiloxane units and 10 mol% of methylphenylsiloxane units (viscosity of 0.01 m$^2$/s) was mixed with a copolymer (30 parts) consisting of $SiO_2$ units, $CH_3SiO_{0.5}$ units and $(CH_3)_2(CH_2=CH)SiO_{0.5}$ units (vinyl group content of 3 mol%). Polymethylhydrogensiloxane (4 parts) having terminal trimethylsilyl groups on both ends as in Example 3 and Ketjenblack EC (Lion Akuzo K.K.) (15 parts) were mixed with the above mixture. In addition, a solution of chloroplatinic acid hexahydrate in isopropyl alcohol was added in an amount of 20 ppm as platinum based on the above-mentioned polysiloxane. The mixture was poured into a mold and cured in an oven at 150° C. for 30 minutes as Experiment No. 13. Polymethylphenylsiloxane (10 parts) having terminal hydroxyl groups on both ends with a degree of polymerization of 30 was added to the composition as in Experiment No. 13 and the mixture was cured for Experiment No. 14. As a comparative example, the same amount of Vulcan XC-72 (Cobot Corp.) was added instead of the Ketjenblack EC as in Experiment No. 13, and the mixture was cured for Experiment No. 15. The volume resistivity of the cured products was measured. The results are presented in Table V. The composition containing component (C) as in Experiment No. 14 showed improved flowability and was found to be most suitable for injection molding.

TABLE V

| | This invention | | Comparative Example |
|---|---|---|---|
| Experiment No. | 13 | 14 | 15 |
| Volume resistivity (Ω-m) | 0.25 | 0.21 | 100 |

That which is claimed is:

1. A curable liquid composition comprising (A) 100 parts by weight of a curable liquid organopolysiloxane comprising a liquid polyorganosiloxane and a cross-linking agent and (B) 0.1 to 70 parts by weight of carbon black whose specific surface area is at least 900 m$^2$/g and which are hollow-shell-shaped particles.

2. The composition according to claim 1 further comprising a hydroxyl endblocked polydiorganosiloxane whose degree of polymerization is 50 or less, said polydiorganosiloxane being present in an amount of up to 50 parts by weight.

3. The composition according to claim 1 wherein the cross-linking agent is an organic peroxide.

4. The composition according to claim 2 wherein the cross-linking agent is an organic peroxide.

5. The composition according to claim 1 in which the liquid polyorganosiloxane contains silicon-bonded hydroxyl group molecule ends and the cross-linking agent is a functional compound selected from the group consisting of a silane, a partial hydrolysis-condensation product of the silane, a cyclic polyorganosiloxane, and a straight chain polyorganosiloxane wherein said cross-linking agent has at least two functional groups per molecule which are bonded to silicon atoms and which are hydrolyzable with moisture, any remaining valences are satisifed by divalent oxygen atoms linking silicon atoms to form Si-O-Si bonds substituted or unsubstituted monovalent hydrocarbon radicals.

6. The composition according to claim 5 further comprising a hydroxyl endblocked polydiorganosiloxane whose degree of polymerization is 50 or less, said polydiorganosiloxane being present in an amount of up to 50 parts by weight.

7. A composition obtained by adding to the composition of claim 5 a catalyst which accelerates the condensation reaction between the polyorganosiloxane containing silicon-bonded hydroxyl groups and the functional compound.

8. A composition obtained by adding to the composition of claim 6 a catalyst which accelerates the condensation reaction between the polyorganosiloxane and the functional compound.

9. The composition according to claim 1 in which the liquid polyorganosiloxane has silicon-bonded vinyl radicals and the cross-linking agent is an organohydrogensilane or a polyorganohydrogensiloxane having the average unit formula $$R_b H_c SiO_{\frac{4-b-c}{2}}$$

wherein R is a substituted or unsubstituted monovalent hydrocarbon radical, b has a value such that $0 < b \leq 3$, c has a value such that $0 < c \leq 2$, and the sum of $b+c$ has a value such that $0 < b+c \leq 4$.

10. A composition obtained by adding to the composition of claim 9 a catalyst for the addition reaction and where the catalyst contains a metal selected from platinum, rhodium and palladium.

* * * * *